(12) United States Patent
Kurata et al.

(10) Patent No.: US 7,155,905 B2
(45) Date of Patent: Jan. 2, 2007

(54) POWER STEERING APPARATUS

(75) Inventors: Masakazu Kurata, Yokohama (JP); Tadaharu Yokota, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/232,864

(22) Filed: Sep. 23, 2005

(65) Prior Publication Data
US 2006/0064973 A1   Mar. 30, 2006

(30) Foreign Application Priority Data
Sep. 27, 2004   (JP) ............................ 2004-278690

(51) Int. Cl.
*B62D 5/06* (2006.01)
(52) U.S. Cl. ...................... 60/384; 60/473; 180/422
(58) Field of Classification Search ............... 60/384, 60/403, 468, 473, 476, 494; 180/421, 422
See application file for complete search history.

(56) References Cited

U.S. PATENT DOCUMENTS 6,152,254 A * 11/2000 Phillips ...................... 180/422
6,152,717 A    11/2000 Morita et al.
6,161,069 A    12/2000 Fujita
6,283,243 B1 *  9/2001 Bohner et al. ............... 180/406
6,513,620 B1 *  2/2003 Igawa et al. ................. 180/422

FOREIGN PATENT DOCUMENTS

EP    0 999 114 A2    5/2000
JP    2000-142434 A   5/2000

* cited by examiner

*Primary Examiner*—Igor Kershteyn
(74) *Attorney, Agent, or Firm*—Foley & Lardner LLP

(57) ABSTRACT

A power steering apparatus includes a hydraulic power cylinder, and a reversible pump driven by a motor. A steering assist sensor senses a steering assist force provided to a steering wheel. A controller ascertains a pump discharge quantity of the reversible pump, and a cylinder volume variation of the pressure chambers of the hydraulic power cylinder; and calculates a leak quantity of the reversible pump from a difference between the pump discharge quantity and the cylinder volume variation. The controller controls the motor to cause the motor to produce a desired fluid pressure in accordance with the steering assist force and the leak quantity.

20 Claims, 4 Drawing Sheets

POWER STEERING APPARATUS

BACKGROUND OF THE INVENTION

The present invention relates to a power steering system or apparatus, and more specifically to a motor-driven hydraulic power steering system.

At very low temperatures at which the viscosity of an operating oil is high, a motor-driven hydraulic power steering system drives an electric motor and circulates the operating oil for warm-up. For the control of the motor, there is provided, in general, a temperature sensor for sensing the temperature of the operating oil. A U.S. Pat. No. 6,161,069 (Fujita)(≈JP 2000-142434 A≈EP 0 999 114 A2) shows power steering apparatus for estimating an oil temperature, without using a temperature sensor, from the temperature of a motor driver element and a motor current.

SUMMARY OF THE INVENTION

However, it is difficult to estimate the oil temperature accurately especially when a motor driver element is separate from a pump unit.

It is therefore an object of the present invention to provide power steering apparatus designed to estimate a leak quantity of a pump and control a steering assist force adequately even when a motor driver element is separate from a pump unit.

According to one aspect of the invention, a power steering apparatus comprises: a hydraulic power cylinder including first and second pressure chambers and a piston separating the first and second pressure chambers to provide a steering force to a steering mechanism connected with a steering wheel; a reversible pump including a first outlet connected with the first pressure chamber through a first fluid passage, and a second outlet connected with the second pressure chamber through a second fluid presage to supply a fluid pressure to the first pressure chamber or the second pressure chamber selectively; a motor arranged to drive the reversible pump in a forward rotational direction or a reverse rotational direction; a steering assist force sensor arranged to sense a steering assist force provided to the steering wheel; a pump discharge quantity measuring section configured to ascertain a pump discharge quantity of the reversible pump; a cylinder volume variation measuring section configured to ascertain a cylinder volume variation of one of the pressure chambers of the hydraulic power cylinder; a leak quantity calculating circuit configured to calculate a leak quantity of the reversible pump from a difference between the pump discharge quantity and the cylinder volume variation; and a motor control circuit configured to deliver a motor drive signal to the motor to cause the motor to produce the fluid pressure in accordance with the steering assist force and the leak quantity.

According to another aspect of the present invention, a power steering apparatus comprises: a hydraulic power cylinder including first and second pressure chambers and a piston separating the first and second pressure chambers to provide a steering force to a steering mechanism connected with a steering wheel; a reversible pump including a first outlet connected with the first pressure chamber through a first fluid passage, and a second outlet connected with the second pressure chamber through a second fluid presage to supply a fluid pressure to the first pressure chamber or the second pressure chamber selectively; a motor arranged to drive the reversible pump in a forward rotational direction or a reverse rotational direction; a steering assist force sensor arranged to sense a steering assist force provided to the steering wheel; a leak quantity measuring section configured to ascertain a leak quantity of the reversible pump an oil temperature estimating circuit configured to estimate an oil temperature of an operating oil for the hydraulic power cylinder; and a motor control circuit configured to deliver a motor drive signal to the motor to cause the motor to produce the fluid pressure in accordance with the steering assist force and the oil temperature.

According to still another aspect of the present invention, a power steering apparatus comprises: a hydraulic power cylinder including first and second pressure chambers and a piston separating the first and second pressure chambers to provide a steering force to a steering mechanism connected with a steering wheel; a reversible pump including a first outlet connected with the first pressure chamber through a first fluid passage, and a second outlet connected with the second pressure chamber through a second fluid presage to supply a fluid pressure to the first pressure chamber or the second pressure chamber selectively; a motor arranged to drive the reversible pump in a forward rotational direction or a reverse rotational direction; a steering torque sensor arranged to sense a steering torque to be provided to the steering wheel; a pump discharge quantity calculating circuit configured to calculate a pump discharge quantity of the reversible pump; a cylinder volume variation calculating circuit configured to calculate a cylinder volume variation of one of the pressure chambers of the hydraulic power cylinder; a leak quantity calculating circuit configured to calculate a leak quantity of the reversible pump from a difference between the pump discharge quantity and the cylinder volume variation; an oil temperature estimating circuit configured to estimate an oil temperature from the leak quantity; and a motor control circuit configured to deliver a motor drive signal to the motor to cause the motor to produce the fluid pressure in accordance with the steering torque and the oil temperature.

DETAILED DESCRIPTION OF THE INVENTION

Figure 1:
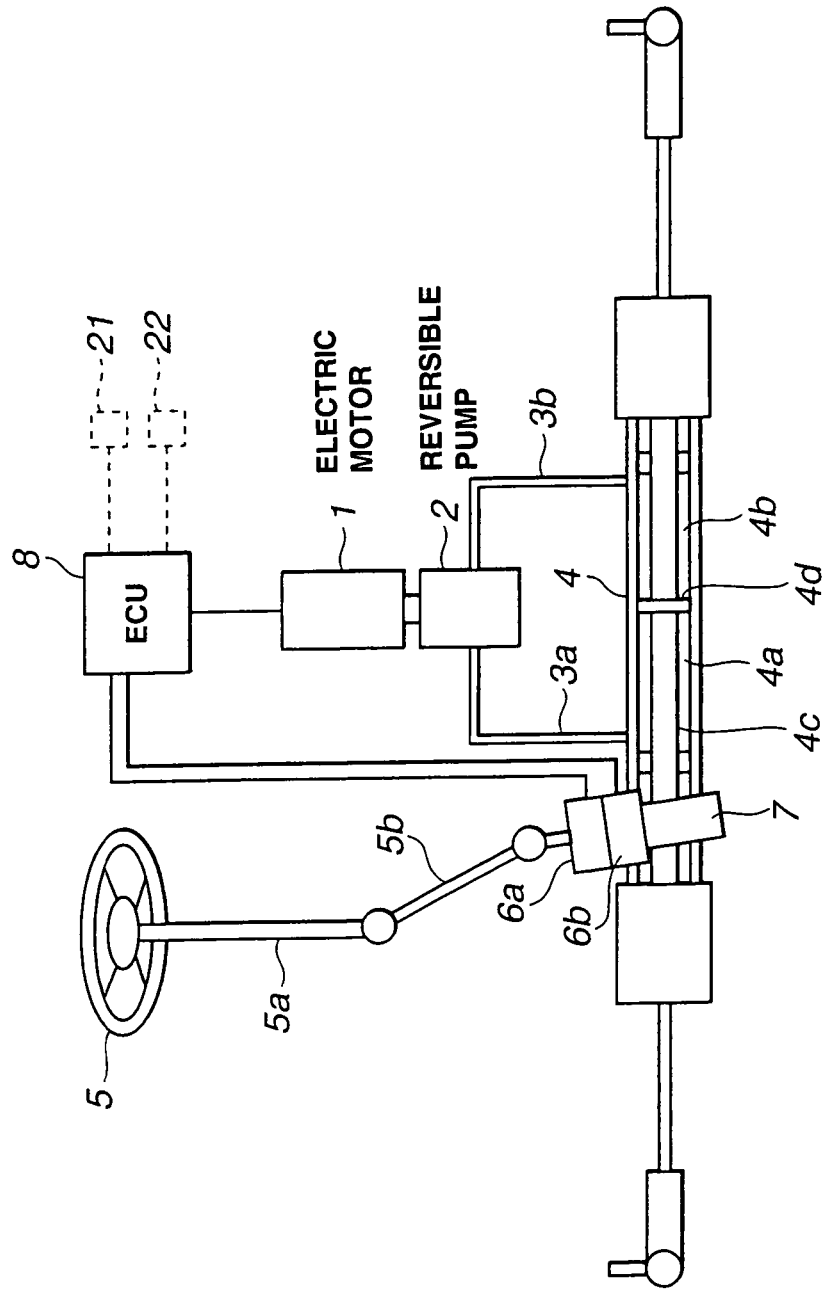
FIG. 1 is a schematic view showing a power steering system according to one embodiment of the present invention.

FIG. 1 shows a power steering apparatus according to one embodiment of the present invention. An electric motor 1 is connected with a reversible pump 2. Electric motor 1 includes a drive shaft for driving the reversible pump 2. Reversible pump 2 includes a first outlet connected through a first fluid passage 3a with a first chamber 4a of a hydraulic power cylinder 4 (on the left side as viewed in FIG. 1), and a second outlet connected through a second fluid passage 3b with a second chamber 4b of hydraulic power cylinder 4 for assisting a steering effort.

A steering wheel 5 is connected through steering shafts 5a and 5b with a steering mechanism 7 for converting the rotation of steering wheel 5 into motion in the widthwise or lateral direction of a vehicle. In this example, steering mechanism 7 is a steering gear mechanism of a rack and pinion type including a pinion gear connected with steering shaft 5b for receiving rotation from steering wheel 5, and a rack gear connected with a shaft 4c of a piston 4d of hydraulic power cylinder 4.

In the linkage including steering shaft 5b between steering wheel 5 and steering gear 7, there are provided a steering torque sensor 6a (serving as a sensor for sensing a steering assist force) and a steering angle sensor 6b to sense a rotational angle of steering shaft 5b. An electronic control unit (ECU) 8 receives a steering torque signal from steering torque sensor 6a and a steering angle signal from steering angle sensor 6b, and determines a steering torque Th and a steering speed Vh.

ECU 8 performs operations to supply current to motor 1 in accordance with the torque signal. Motor 1 produces torque in accordance with the current, and transmits the torque to pump 2. Pump 2 produces a hydraulic pressure in accordance with the torque of motor 1. Power cylinder 4 produces a steering assist force in accordance with the hydraulic pressure supplied from pump 2.

Figure 2:
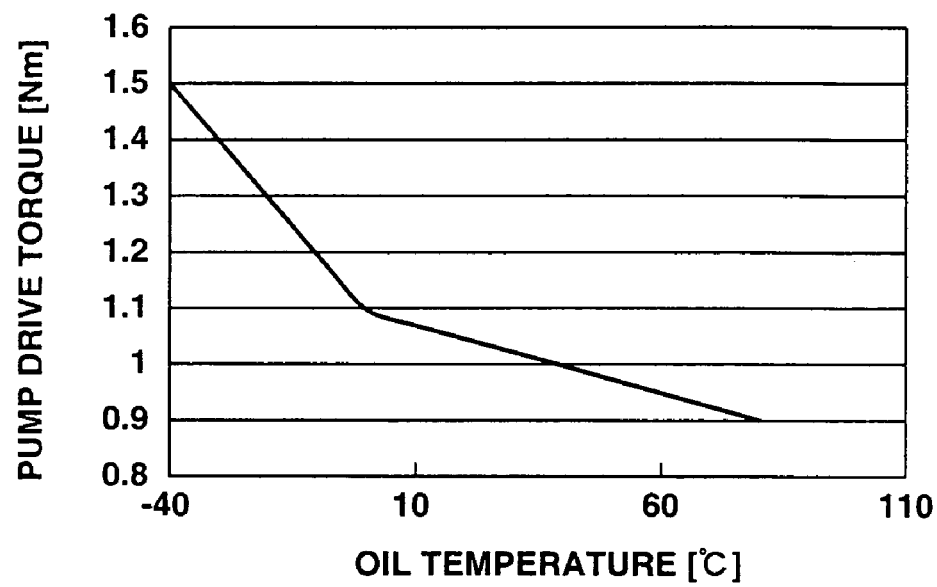
FIG. 2 is a graphic view showing a characteristic of a pump drive torque with respect to an operating oil temperature, used in the power steering system according to the embodiment.
Figure 3:
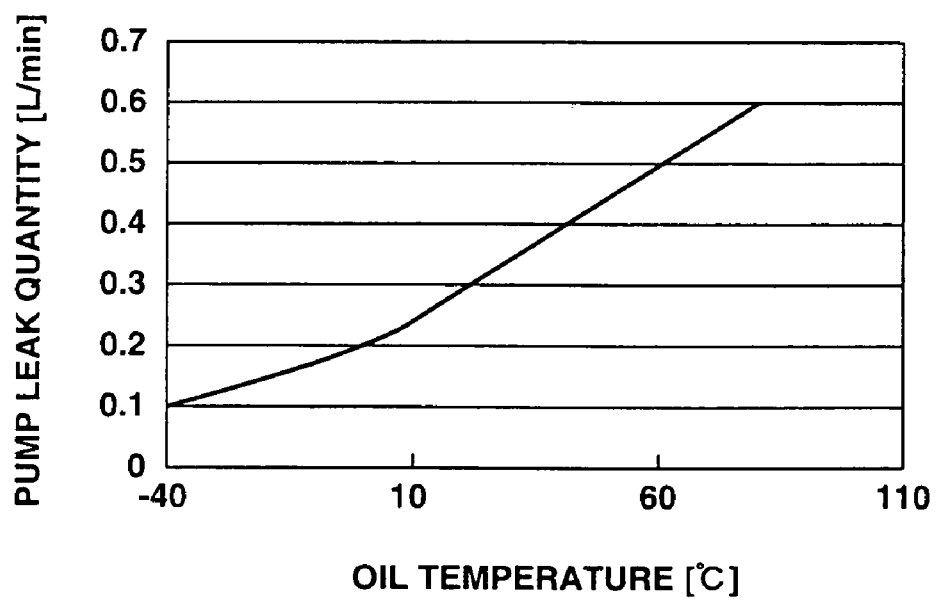
FIG. 3 is graphic view showing a characteristic of a pump leak quantity with respect to the operating oil temperature, used in the power steering system according to the embodiment.

FIG. 2 shows variation of a pump driving torque [Nm] with respect to an operating oil temperature; and FIG. 3 shows variation of a pump leak quantity [L/min] (discharging performance) with respect to the operating oil temperature. The driving torque and the discharge (flow) rate of reversible pump 2 vary in dependence on the oil temperature. As shown in FIG. 2, the driving torque of reversible pump 2 decreases as the oil temperature increases. The pump leak quantity increases as the oil temperature increases. Variation of the pump driving torque results in variation of the steering assist force or the steering torque Th. Therefore, it is desirable to modify a steering assist characteristic in accordance with the oil temperature. The power steering system according to the embodiment estimates variation of the pump discharge (flow) rate from the steering speed Vh, and a motor revolution speed Nm, and estimates variation of the operating oil temperature from variation of the pump discharge rate. In accordance with the estimated oil temperature, the power steering system controls the motor current corresponding to the torque signal, for optimum performance.

In order to estimate the operating oil temperature and to determine an adequate steering assist force, ECU 8 performs the following functions.

Measurement of Pump Discharge Quantity: ECU 8 serves as at least part of a pump discharge quantity measuring section. To this end, ECU 8 determines motor revolution speed Nm by sensing or estimation; determines the pump revolution speed which is proportional to motor revolution speed Nm; and ascertains (senses or estimates) a pump discharge rate (Qp×Nm) (the pump discharge quantity per unit time) by multiplication between the pump revolution speed and a per-revolution pump discharge quantity Qp which is a discharge quantity per one pump revolution. When motor 1 is a brushless motor, the motor speed Nm is sensed by a position sensor 21 (shown by a broken line in FIG. 1) of the brushless motor, such as a Hall effect sensor. In this case, it is possible to sense the motor speed accurately. When motor 1 is a brush motor, the motor revolution speed Nm can be determined by estimation from the motor current or motor voltage.

Measurement of Cylinder Volume Variation: ECU 8 serves as at least part of a cylinder volume variation measuring section. Accordingly, ECU 8 determines (by estimation or sensing) a cylinder volume variation which a variation quantity of the cylinder volume of each pressure chamber of hydraulic power cylinder 4 per unit time, from a piston displacement (amount of movement) of the piston of the power cylinder 4 per unit time, and a cross sectional area S of cylinder 4 (that is, the pressure receiving area). The piston displacement per unit time (or piston speed) of power cylinder 4 is proportional to an angular (or rotational) displacement of steering wheel 5 per unit time (or angular speed of steering wheel 5). Therefore, in this example, ECU 8 estimates the cylinder volume variation per unit time (or cylinder volume variation rate)(=Vh×r×S) by multiplication of the above-mentioned steering speed Vh, a gear ratio r of rack and pinion steering gear mechanism 7 and pressure receiving area S of cylinder 4. Alternatively, it is optional to determine the piston displacement with a position sensor 22 (shown by a broken line in FIG. 1) for sensing the piston displacement directly.

Calculation of Leak Quantity: ECU 8 serves as a leak quantity calculating circuit for calculating a leak quantity or reversible pump 2. ECU 8 calculates a leak quantity (or leakage) of reversible pump 2 by determining a difference between the pump discharge quantity (Qp×Nm) and the cylinder volume variation (Vh×r×S).

Estimation of Oil Temperature: ECU 8 serves as an oil temperature estimating circuit. The pump leak quantity is substantially proportional to the oil temperature at least in a temperature range above a predetermined temperature as shown in FIG. 3. Therefore, ECU 8 estimates the oil temperature from the leak quantity.

Control of Motor: ECU 8 serves as a motor control circuit to control electric motor 1 in accordance with the steering torque and the leak quantity. ECU 8 determines the steering assist force only in accordance with steering torque Th when the steering torque Th supplied from steering torque sensor 6a is greater than or equal to a predetermined value. When the steering wheel is in an abutting state and the power cylinder is in an abutting state, the amount of movement of the piston in cylinder 4 becomes equal to zero. On the other hand, the output of torque sensor 6a increases, and becomes equal to or greater than the predetermined value, and hence the motor speed Nm increases. Therefore, the leak quantity of reversible pump 2 increases. This increase of the leak quantity is not due to a decrease in the viscosity of the operating oil with an increase in the temperature. Therefore, the power steering system can prevent deterioration of the steering feeling by inhibiting the modification of the steering assist force based on the leak quantity in the case of the steering wheel abutting state.

Figure 4:
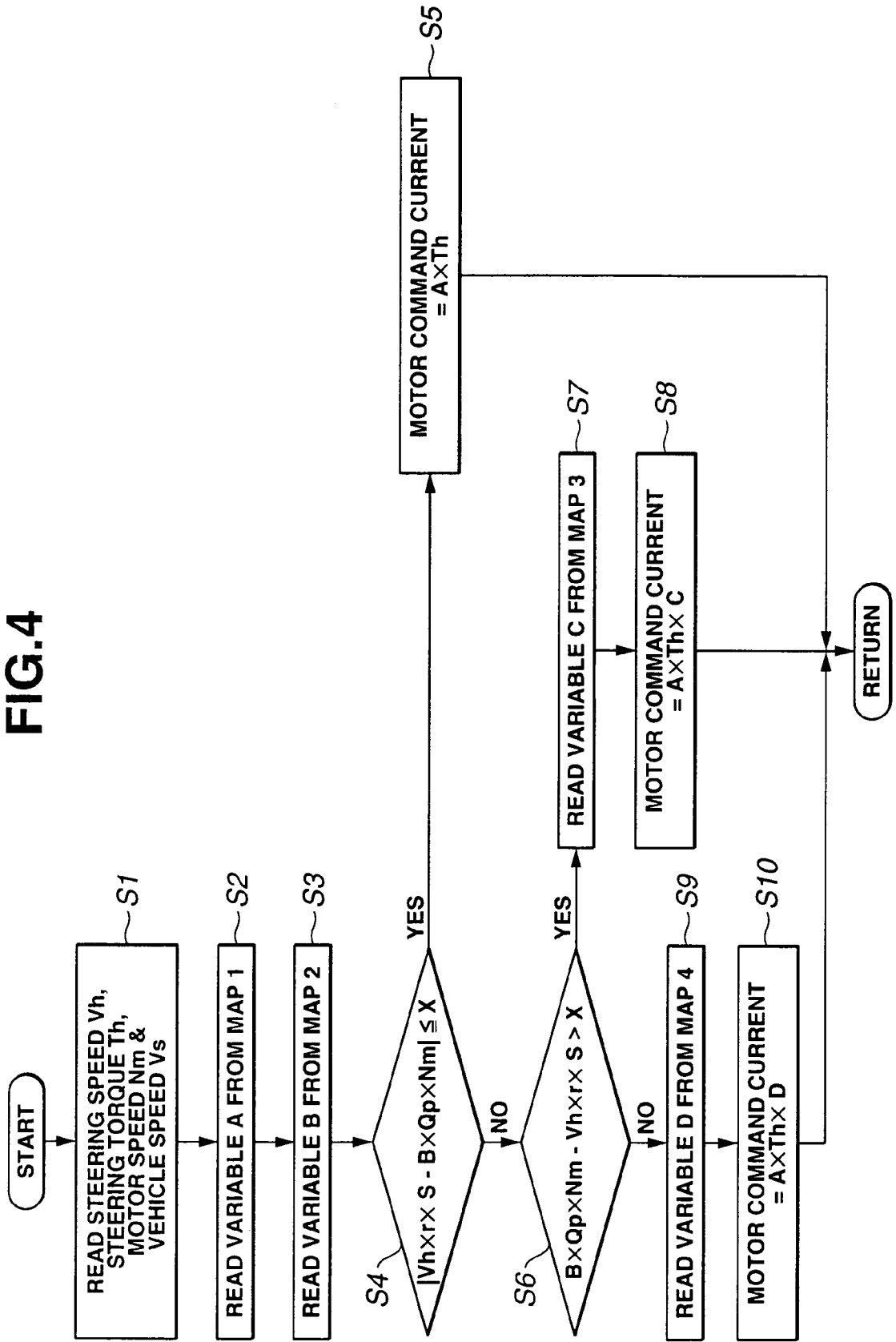
FIG. 4 is a flowchart showing a steering assist force control process performed by the power steering system according to the embodiment.
Figure 5A:
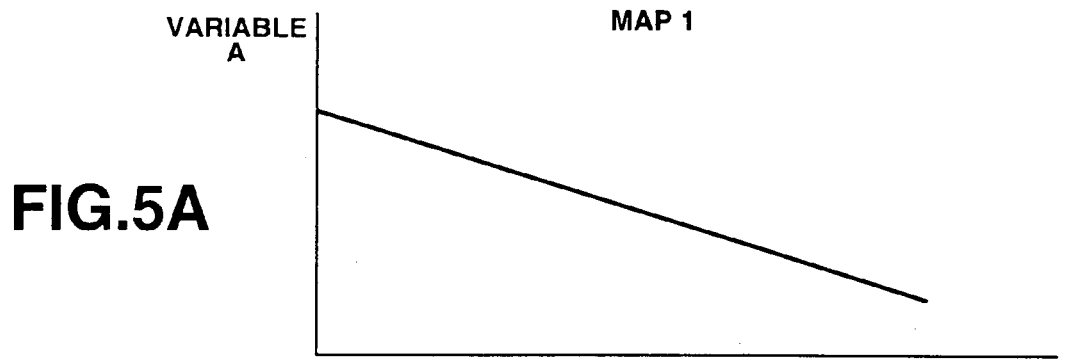
FIG. 5A is a graphic view showing a map 1 for determining a variable A used, in the process of FIG. 4, for modification to decrease a motor command current with an increase in vehicle speed Vs.
Figure 5B:
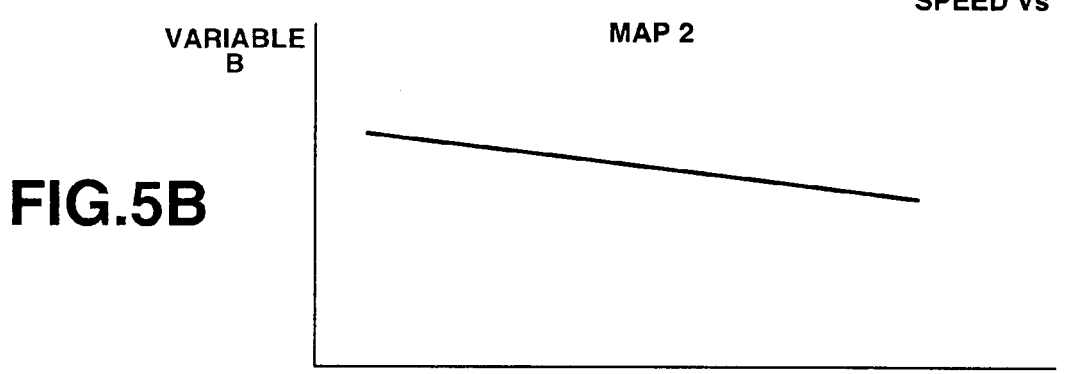
FIG. 5B is a graphic view showing a map 2 for determining a variable B used, in the process of FIG. 4, for making a calculated pump discharge quantity closer to an actual pump discharge quantity in accordance with an increase in a steering torque Th.
Figure 5C:
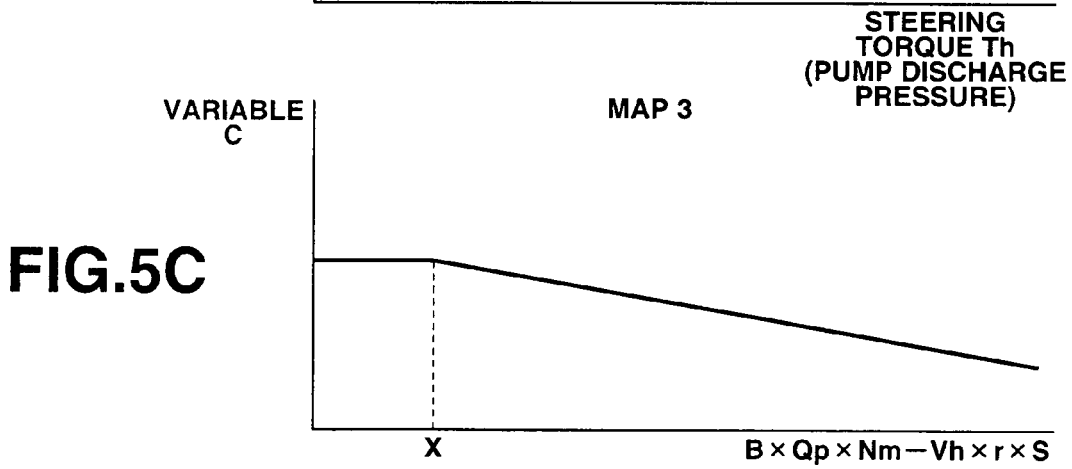
FIG. 5C is a graphic view showing a map 3 for determining a variable C for decreasing the motor command current with increase in the oil temperature.
Figure 5D:
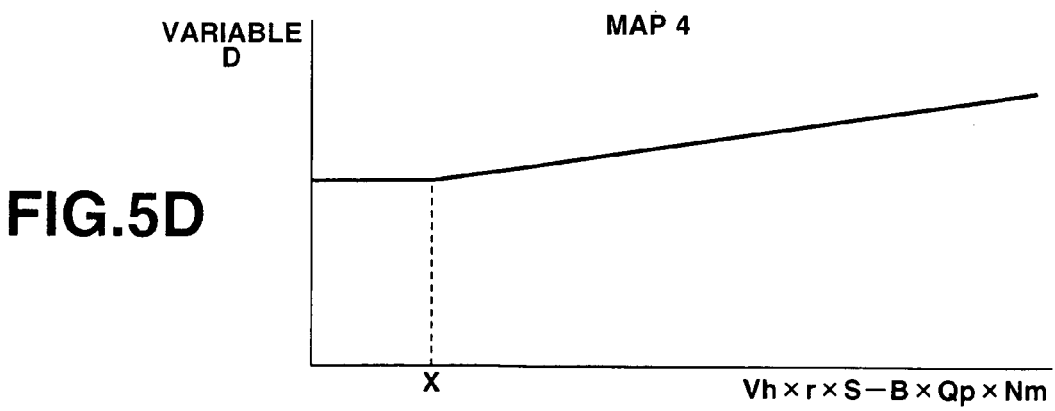
FIG. 5D is graphic view showing a map 4 for determining a variable D for increasing the motor command current with decrease in the oil temperature.

FIGS. 5A, 5B, 5C and 5D show variables (coefficients) A~D used in a steering assist force control process shown in FIG. 4 performed by ECU 8. FIG. 5A shows a map 1 for determining the variable A used for modification to decrease the motor command current with an increase in vehicle speed Vs. As shown in FIG. 5A, variable A decreases monotonically, and linearly in this example, with increase in vehicle speed Vs. FIG. 5B shows a map 2 for determining the variable B used for making a calculated pump discharge quantity closer to an actual pump discharge quantity since the actual pump discharge quantity decreases, even if the pump revolution speed remains unchanged, when the pump discharge pressure become higher with an increase in the steering torque Th. As shown in FIG. 5B, the variable B decreases monotonically, and linearly in this example, with increase in the steering torque Th (or pump discharge pressure). FIG. 5C shows a map 3 for determining the variable C for decreasing the motor command current with increase in the oil temperature (or the leak quantity). FIG. 5D shows a map 4 for determining the variable D for increasing the motor command current with decrease in the oil temperature (or the leak quantity).

FIG. 4 shows the steering assist force control process performed by ECU 8. In a memory of ECU8, there are preliminarily stored the above-mentioned per-revolution pump discharge quantity Qp of reversible pump 2 for use in calculation of the pump discharge quantity; and the gear ratio r of steering gear mechanism 7 and the pressure receiving area S of cylinder 4 for use in calculation of the cylinder volume variation. When a steering operation is started, ECU 8 reads steering speed Vh, steering torque Th, motor speed Nm and vehicle speed Vs at a step S1. Then, ECU 8 reads a value of variable A corresponding to vehicle speed Vs from map 1 at S2, and reads a value of variable B corresponding to steering torque Th at S3.

At S4, ECU 8 determines a per-unit-time cylinder volume variation (Vh×r×S)(a cylinder volume variation rate) from steering speed Vh, gear ratio R and pressure receiving area S of cylinder 4; determines a per-unit-time pump discharge quantity (or a pump discharge rate)(Qp×Nm) from motor speed Nm and per-revolution pump discharge quantity (Qp) per one revolution of pump 2; determines a leak quantity from a difference between the per-unit-time cylinder volume variation (Vh×r×S) and a modified per-unit-time pump discharge quantity (B×Qp×Nm) which can be obtained by multiplying the per-unit-time pump discharge quantity (Qp×Nm) by the variable B; and compares the leak quantity with a predetermined value X to examine whether the leak quantity is within a predetermined region determined by X.

When the answer of S4 is YES (|Vh×r×S−B×Qp×Nm|≦X), then ECU 8 considers that the leak quantity (the oil temperature) is adequate and there is no need to adjust the gain of the steering assist, and hence produces the motor command current (A×Th) obtained by modifying steering torque Th with variable A at a step S5.

When the answer of S4 is NO, then ECU 8 examines whether the difference between the per-unit-time cylinder volume variation (Vh×r×S) and the modified per-unit-time pump discharge quantity (B×Qp×Nm) is greater than threshold value X at a step S6. When the answer of S6 is YES (B×Qp×Nm−Vh×r×S>X), ECU 8 considers that the pump speed is high and the oil temperature is high as compared with a normal state; reads variable C for decreasing the steering assist gain, at a step S7; and produces the motor command current (A×Th×C) which is decreased than the normal state by multiplication of variable C, at a step S8. When the answer of S6 is NO (B×Qp×Nm−Vh×r×S≦X), ECU 8 considers that the pump speed is low and the oil temperature is low as compared with the normal state; reads variable D for increasing the steering assist gain, at a step S9; and produces the motor command current (A×Th×D) which is increased than the normal state by multiplication of variable D, at a step S10.

In the thus-constructed power steering control system according to this embodiment, a controller formed by ECU 8 is configured to estimate the temperature of the operating oil by determining the leak quantity of reversible pump 2 from the steering speed (Vh) and motor speed (Nm). Therefore, the power steering system can determine the steering assist force adequately from the estimated oil temperature even if the position of the motor drive and the position of the pump unit are separate from each other. The power steering system according to the embodiment is advantageous even when the motor driver and the pump unit are installed in the vicinity of each other since the power steering system according to the embodiment can estimate the temperature of the operating oil accurately and control the motor accurately.

In the illustrated embodiment, the power steering control system employs only one threshold value X for changing over the mode of modification. However, it is optional to use two or more threshold values. Moreover, the power steering control system may be arranged to vary the correction or modification quantity continuously, by using a map, with respect to the difference between the per-unit-time cylinder volume variation and the per-unit-time pump discharge quantity.

The reversible pump 2 may be an internal gear pump including an inner ring driven by the motor, and an outer ring engaging with the inner ring. In this case, the per-revolution discharge quantity Qp is a volume of an interspace formed between the inner ring and the outer ring. A U.S. Pat. No. 6,152,717 to Morita et al. discloses an internal gear pump which can be employed in the power steering system according to the embodiment. The explanation and figures of this U.S. Patent about the internal gear pump are hereby incorporated by reference. In the illustrated example, the drive shaft of the motor (1) is connected with the reversible pump (2) in such a direct-drive manner that the pump (2) and the drive shaft of the motor (1) rotate at the same speed.

In the illustrated embodiment of the present invention, ECU 8 serves a main component of a controller which is configured to ascertain a pump discharge quantity of the reversible pump; to ascertain a cylinder volume variation of one of the pressure chambers of the hydraulic power cylinder; to calculate a leak quantity of the reversible pump from a difference between the pump discharge quantity and the cylinder volume variation; and to deliver a motor drive signal to the motor to cause the motor to produce the fluid pressure in accordance with the steering assist force and the leak quantity. The controller may be configured to detect or estimate ascertain a leak quantity of the reversible pump; to estimate an oil temperature of an operating oil for the hydraulic power cylinder; and to control the motor in accordance with the steering assist force and the oil temperature.

This application is based on a prior Japanese Patent Application No. 2004-278690 filed on Sep. 27, 2004. The entire contents of this Japanese Patent Application No. 2004-278690 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power steering apparatus comprising:
   a hydraulic power cylinder including first and second pressure chambers and a piston separating the first and second pressure chambers to provide a steering force to a steering mechanism connected with a steering wheel;
   a reversible pump including a first outlet connected with the first pressure chamber through a first fluid passage, and a second outlet connected with the second pressure chamber through a second fluid presage to supply a fluid pressure to the first pressure chamber or the second pressure chamber selectively;
   a motor arranged to drive the reversible pump in a forward rotational direction or a reverse rotational direction;
   a steering assist force sensor arranged to sense a steering assist force to be provided to the steering wheel;
   a pump discharge quantity measuring section configured to ascertain a pump discharge quantity of the reversible pump;
   a cylinder volume variation measuring section configured to ascertain a cylinder volume variation of one of the pressure chambers of the hydraulic power cylinder;
   a leak quantity calculating circuit configured to calculate a leak quantity of the reversible pump from a difference between the pump discharge quantity and the cylinder volume variation; and
   a motor control circuit configured to deliver a motor drive signal to the motor to cause the motor to produce the fluid pressure in accordance with the steering assist force and the leak quantity.

2. The power steering apparatus as claimed in claim 1, wherein the pump discharge quantity measuring section is configured to calculate the pump discharge quantity of the reversible pump, by multiplying a per-revolution discharge quantity of the reversible pump by a revolution speed of the reversible pump.

3. The power steering apparatus as claimed in claim 2, wherein the reversible pump is an internal gear pump including an inner ring driven by the motor, and an outer ring engaging with the inner ring; and the per-revolution discharge quantity is a volume of an interspace formed between the inner ring and the outer ring.

4. The power steering apparatus as claimed in claim 2, wherein the motor is a brushless motor including a drive shaft and a position sensor to sense a rotational position of the drive shaft; and the revolution speed of the reversible pump is estimated from an output signal of the position sensor.

5. The power steering apparatus as claimed in claim 4, wherein the drive shaft of the motor is connected with the reversible pump so that the pump and the drive shaft of the motor (1) rotate at the same speed.

6. The power steering apparatus as claimed in claim 1, wherein the cylinder volume variation measuring section is configured to calculate the cylinder volume variation by multiplying a cross sectional area of the pressure chambers of the power cylinder by an amount of movement of the piston.

7. The power steering apparatus as claimed in claim 6, wherein the power steering apparatus further comprises a steering shaft connecting the steering wheel with the steering mechanism, and a steering angle sensor arranged to sense a rotational angle of the steering shaft; and the amount of movement of the piston of the hydraulic power cylinder is estimated from an output signal of the steering angle sensor.

8. The power steering apparatus as claimed in claim 6, wherein the power steering apparatus further comprises a position sensor arranged to sense the amount of movement of the piston of the hydraulic power cylinder, and the amount of movement of the piston of the hydraulic power cylinder (4) is determined from an output signal of the position sensor.

9. The power steering apparatus as claimed in claim 1, wherein the motor control circuit is configured to control the motor by producing the motor drive signal without regard to the leak quantity when the hydraulic power cylinder is in an abutting state.

10. The power steering apparatus as claimed in claim 9, wherein the motor control circuit is configured to judge the hydraulic power cylinder to be in the abutting state when an output signal of the steering assist force sensor is equal to or greater than a predetermined value.

11. The power steering apparatus as claimed in claim 1, wherein the power steering apparatus further comprises an oil temperature estimating circuit configured to estimate an oil temperature from the leak quantity; and the motor control circuit is configured to control the motor in accordance with the steering assist force and the oil temperature.

12. The power steering apparatus as claimed in claim 1, wherein the pump discharge quantity measuring section is configured to decrease the pump discharge quantity of the reversible pump as an output value of the steering assist sensor increases.

13. A power steering apparatus comprising:
   a hydraulic power cylinder including first and second pressure chambers and a piston separating the first and second pressure chambers to provide a steering force to a steering mechanism connected with a steering wheel;
   a reversible pump including a first outlet connected with the first pressure chamber through a first fluid passage, and a second outlet connected with the second pressure chamber through a second fluid presage to supply a fluid pressure to the first pressure chamber or the second pressure chamber selectively;
   a motor arranged to drive the reversible pump in a forward rotational direction or a reverse rotational direction;
   a steering assist force sensor arranged to sense a steering assist force provided to the steering wheel;
   a leak quantity measuring section configured to ascertain a leak quantity of the reversible pump;
   an oil temperature estimating circuit configured to estimate an oil temperature of an operating oil for the hydraulic power cylinder; and
   a motor control circuit configured to deliver a motor drive signal to the motor to cause the motor to produce the fluid pressure in accordance with the steering assist force and the oil temperature.

14. The power steering apparatus as claimed in claim 13, wherein the motor control circuit is configured to control the motor by producing the motor drive signal without regard to the oil temperature when the hydraulic power cylinder is in an abutting state.

15. The power steering apparatus as claimed in claim 14, wherein the motor control circuit is configured to judge the hydraulic power cylinder to be in the abutting state when an output signal of the steering assist sensor is equal to or greater than a predetermined value.

16. A power steering apparatus comprising:
- a hydraulic power cylinder including first and second pressure chambers and a piston separating the first and second pressure chambers to provide a steering force to a steering mechanism connected with a steering wheel;
- a reversible pump including a first outlet connected with the first pressure chamber through a first fluid passage, and a second outlet connected with the second pressure chamber through a second fluid presage to supply a fluid pressure to the first pressure chamber or the second pressure chamber selectively;
- a motor arranged to drive the reversible pump in a forward rotational direction or a reverse rotational direction;
- a steering torque sensor arranged to sense a steering torque to be provided to the steering wheel;
- a pump discharge quantity calculating circuit configured to calculate a pump discharge quantity of the reversible pump;
- a cylinder volume variation calculating circuit configured to calculate a cylinder volume variation of one of the pressure chambers of the hydraulic power cylinder;
- a leak quantity calculating circuit configured to calculate a leak quantity of the reversible pump from a difference between the pump discharge quantity and the cylinder volume variation;
- an oil temperature estimating circuit configured to estimate an oil temperature from the leak quantity; and
- a motor control circuit configured to deliver a motor drive signal to the motor to cause the motor to produce the fluid pressure in accordance with the steering torque and the oil temperature.

17. The power steering apparatus as claimed in claim 16, wherein the motor control circuit is configured to control the motor by producing the motor drive signal without regard to the oil temperature when the hydraulic power cylinder is in an abutting state.

18. The power steering apparatus as claimed in claim 17, wherein the motor control circuit is configured to judge the hydraulic power cylinder to be in the abutting state when the steering torque sensed by the steering torque sensor is equal to or greater than a predetermined value.

19. The power steering apparatus as claimed in claim 16, wherein the pump discharge quantity calculating circuit is configured to decrease the pump discharge quantity of the reversible pump as the steering torque sensed by the steering torque sensor increases.

20. The power steering apparatus as claimed in claim 16, wherein the motor control circuit is configured to control the motor by producing the motor drive signal without regard to the oil temperature when the steering torque sensed by the steering torque sensor is equal to or greater than a predetermined value.

* * * * *